(12) United States Patent
Morikazu et al.

(10) Patent No.: US 9,682,440 B2
(45) Date of Patent: Jun. 20, 2017

(54) CHIP MANUFACTURING METHOD (71) Applicant: DISCO CORPORATION, Tokyo (JP)

(72) Inventors: Hiroshi Morikazu, Tokyo (JP);
Noboru Takeda, Tokyo (JP)

(73) Assignee: Disco Corporation, Tokyo (JP)

( * ) Notice: Subject to any disclaimer, the term of this patent is extended or adjusted under 35 U.S.C. 154(b) by 0 days.

(21) Appl. No.: 14/725,773

(22) Filed: May 29, 2015

(65) Prior Publication Data

US 2015/0343559 A1    Dec. 3, 2015

(30) Foreign Application Priority Data

Jun. 2, 2014   (JP) .................................. 2014-113789

(51) Int. Cl.
*B23K 26/00* (2014.01)
*C03B 33/02* (2006.01)
(Continued)

(52) U.S. Cl.
CPC ........ *B23K 26/006* (2013.01); *C03B 33/0222* (2013.01); *C03B 33/03* (2013.01); *C03B 33/033* (2013.01); *C03B 33/082* (2013.01); *C03B 33/091* (2013.01); *C03B 33/04* (2013.01); *Y02P 40/57* (2015.11)

(58) Field of Classification Search
CPC . C03B 33/082; C03B 33/091; C03B 33/0222; C03B 33/033; B23K 26/006; B23K 26/00–26/707
See application file for complete search history.

(56) References Cited

U.S. PATENT DOCUMENTS

| 3,930,825 A | 1/1976 | Chui |
| 4,467,168 A | 8/1984 | Morgan et al. |

(Continued)

FOREIGN PATENT DOCUMENTS

| JP | 2012-148955 | 8/2012 |
| JP | 2013-071854 | 4/2013 |
| JP | 2013-091582 | 5/2013 |

OTHER PUBLICATIONS

Corning Gorilla Glass Product Data Sheet—https://web.archive.org/web/20121030233349/http://www.valleydesign.com/Datasheets/Corning%20Gorilla%20Glass.pdf—(Available online Oct. 30, 2012).*

(Continued)

*Primary Examiner* — Jason L Lazorcik
(74) *Attorney, Agent, or Firm* — Greer Burns & Crain Ltd.

(57) ABSTRACT

A chip having a desired shape is formed from a platelike workpiece. The chip manufacturing method includes a shield tunnel forming step of applying a pulsed laser beam to the workpiece from a focusing unit included in a pulsed laser beam applying unit along the contour of the chip to be formed, with the focal point of the pulsed laser beam set at a predetermined depth from the upper surface of the workpiece, thereby forming a plurality of shield tunnels inside the workpiece along the contour of the chip to be formed. Each shield tunnel has a fine hole and an amorphous region formed around the fine hole for shielding the fine hole. In a chip forming step, ultrasonic vibration is applied to the workpiece to break the contour of the chip where the shield tunnels have been formed, thereby forming the chip from the workpiece.

4 Claims, 10 Drawing Sheets

(51) Int. Cl.
*C03B 33/08* (2006.01)
*C03B 33/03* (2006.01)
*C03B 33/033* (2006.01)
*C03B 33/09* (2006.01)
*C03B 33/04* (2006.01)

(56) References Cited

U.S. PATENT DOCUMENTS

| | | | |
|---|---|---|---|
| 5,387,776 A | 2/1995 | Preiser | |
| 6,204,472 B1 | 3/2001 | Muzzi et al. | |
| 6,512,196 B1 | 1/2003 | Yoon et al. | |
| 7,015,071 B2* | 3/2006 | Wada | H01L 21/304 257/E21.237 |
| 7,757,742 B2* | 7/2010 | Cheung | H01L 21/67132 156/66 |
| 8,264,144 B2 | 9/2012 | Oikawa et al. | |
| 2003/0134734 A1 | 7/2003 | Nishimoto et al. | |
| 2005/0059205 A1* | 3/2005 | Maki | H01L 21/67132 438/232 |
| 2006/0252233 A1* | 11/2006 | Honma | H01L 21/67132 438/464 |
| 2007/0141810 A1* | 6/2007 | Nakamura | B23K 26/0057 438/460 |
| 2009/0081851 A1* | 3/2009 | Sakamoto | B23K 26/0057 438/463 |
| 2009/0250446 A1* | 10/2009 | Sakamoto | B28D 1/221 219/121.72 |
| 2013/0216779 A1* | 8/2013 | Hofmeister | B29C 41/38 428/141 |
| 2013/0247615 A1* | 9/2013 | Boek | C03C 15/00 65/29.1 |
| 2014/0199519 A1* | 7/2014 | Schillinger | B23K 26/0648 428/155 |
| 2015/0034613 A1* | 2/2015 | Hosseini | B23K 26/0057 219/121.61 |
| 2015/0164689 A1* | 6/2015 | Vogel | A61F 9/00827 606/3 |
| 2015/0165548 A1* | 6/2015 | Marjanovic | B23K 26/083 428/43 |
| 2015/0165560 A1* | 6/2015 | Hackert | C03B 33/082 428/43 |
| 2015/0165562 A1* | 6/2015 | Marjanovic | C03B 33/0222 428/64.1 |
| 2015/0165563 A1* | 6/2015 | Manley | B32B 17/00 428/34 |
| 2015/0166391 A1* | 6/2015 | Marjanovic | C03B 33/0222 428/43 |
| 2015/0166393 A1* | 6/2015 | Marjanovic | C03B 33/091 428/131 |
| 2015/0166394 A1* | 6/2015 | Marjanovic | C03B 33/091 428/43 |
| 2015/0166396 A1* | 6/2015 | Marjanovic | B23K 26/0057 428/137 |
| 2015/0232369 A1* | 8/2015 | Marjanovic | C03B 33/0222 428/192 |
| 2015/0259235 A1* | 9/2015 | Takeda | C03B 33/0222 65/112 |
| 2015/0299018 A1* | 10/2015 | Bhuyan | B23K 26/0057 65/29.18 |
| 2015/0375336 A9 | 12/2015 | Webster et al. | |
| 2016/0060156 A1* | 3/2016 | Krueger | B23K 26/064 65/31 |

OTHER PUBLICATIONS

U.S. Appl. No. 14/660,146, filed Mar. 17, 2015.

* cited by examiner

CHIP MANUFACTURING METHOD

BACKGROUND OF THE INVENTION

Field of the Invention

The present invention relates to a chip manufacturing method of forming a chip having a desired shape from a platelike or plate-shaped workpiece such as a glass substrate.

Description of the Related Art

An operation screen in a smartphone or the like is formed from a glass substrate, and an operator can select various applications as viewing the operation screen. Further, portable equipment such as a smartphone includes a camera function, and a cover glass such as a silica glass substrate and a sapphire substrate is mounted on an objective lens in the camera function. Such a cover glass or the like is produced in the form of a chip by etching (see Japanese Patent Laid-open Nos. 2012-148955 and 2013-71854, for example).

SUMMARY OF THE INVENTION

However, there is a problem such that much time is required for etching to cause a reduction in productivity.

It is therefore an object of the present invention to provide a chip manufacturing method which can efficiently form a chip having a desired shape from a platelike workpiece such as a glass substrate.

In accordance with an aspect of the present invention, there is provided a chip manufacturing method of forming a chip having a desired shape from a platelike workpiece, the chip manufacturing method including a shield tunnel forming step of applying a pulsed laser beam having a transmission wavelength to the platelike workpiece from focusing means included in pulsed laser beam applying means along the contour of the chip to be formed in the condition where the focal point of the pulsed laser beam is set at a predetermined depth from the upper surface of the platelike workpiece, thereby forming a plurality of shield tunnels inside the platelike workpiece along the contour of the chip to be formed, each shield tunnel being composed of a fine hole and an amorphous region formed around the fine hole for shielding the fine hole; and a chip forming step of applying ultrasonic vibration to the platelike workpiece processed by the shield tunnel forming step to thereby break the contour of the chip where the shield tunnels have been formed, thereby forming the chip from the platelike workpiece.

Preferably, the numerical aperture (NA) of a focusing lens included in the focusing means is set so that the value obtained by dividing the numerical aperture (NA) of the focusing lens by the refractive index (N) of the platelike workpiece falls within the range of 0.05 to 0.2.

Preferably, the platelike workpiece includes a silica glass substrate, and the numerical aperture (NA) of the focusing lens is set to 0.1 to 0.25. Alternatively, the platelike workpiece includes a sapphire substrate, and the numerical aperture (NA) of the focusing lens is set to 0.1 to 0.35.

As described above, the chip manufacturing method of the present invention includes the shield tunnel forming step of applying a pulsed laser beam having a transmission wavelength to the platelike workpiece from the focusing means included in the pulsed laser beam applying means along the contour of the chip to be formed in the condition where the focal point of the pulsed laser beam is set at a predetermined depth from the upper surface of the platelike workpiece, thereby forming a plurality of shield tunnels inside the platelike workpiece along the contour of the chip to be formed, each shield tunnel being composed of a fine hole and an amorphous region formed around the fine hole for shielding the fine hole, and the chip forming step of applying ultrasonic vibration to the platelike workpiece processed by the shield tunnel forming step to thereby break the contour of the chip where the shield tunnels have been formed, thereby forming the chip from the platelike workpiece. Accordingly, a chip having a desired shape can be formed in a short time by the chip manufacturing method of the present invention as compared with the conventional chip manufacturing method.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
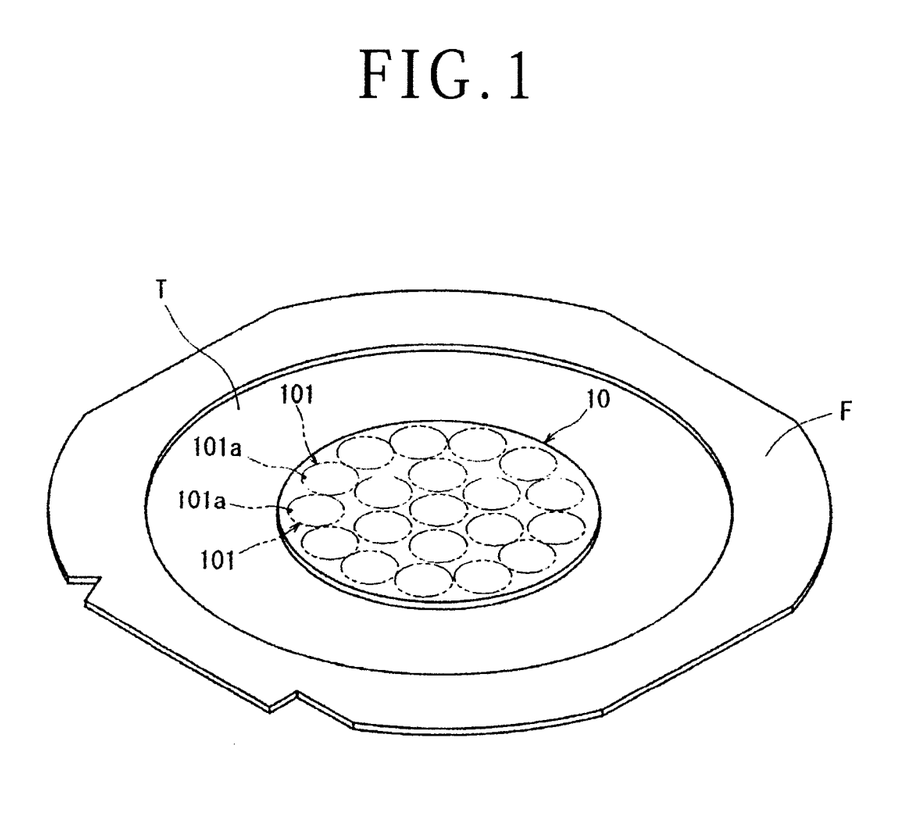
FIG. 1 is a perspective view of a platelike workpiece in the condition where it is attached to a protective tape supported to an annular frame.

A preferred embodiment of the chip manufacturing method according to the present invention will now be described in detail with reference to the attached drawings. FIG. 1 is a perspective view of a platelike or plate-shaped workpiece 10 to be processed by the chip manufacturing method according to the present invention. The platelike workpiece 10 shown in FIG. 1 is a circular single crystal substrate such as a silica glass substrate and a sapphire substrate, and it has a thickness of 500 μm, for example. A plurality of chips are to be formed from the platelike workpiece 10, and the contour 101 of each chip and the processing start position 101a on each contour 101 are set on the front side of the platelike workpiece 10. Data on the contour 101 and the processing start position 101a for each chip to be formed is preliminarily stored in a memory of control means included in a laser processing apparatus to be hereinafter described. The platelike workpiece 10 such as a silica glass substrate and a sapphire substrate is attached to a protective tape T supported to an annular frame F as shown in FIG. 1 (workpiece supporting step).

Figure 2:
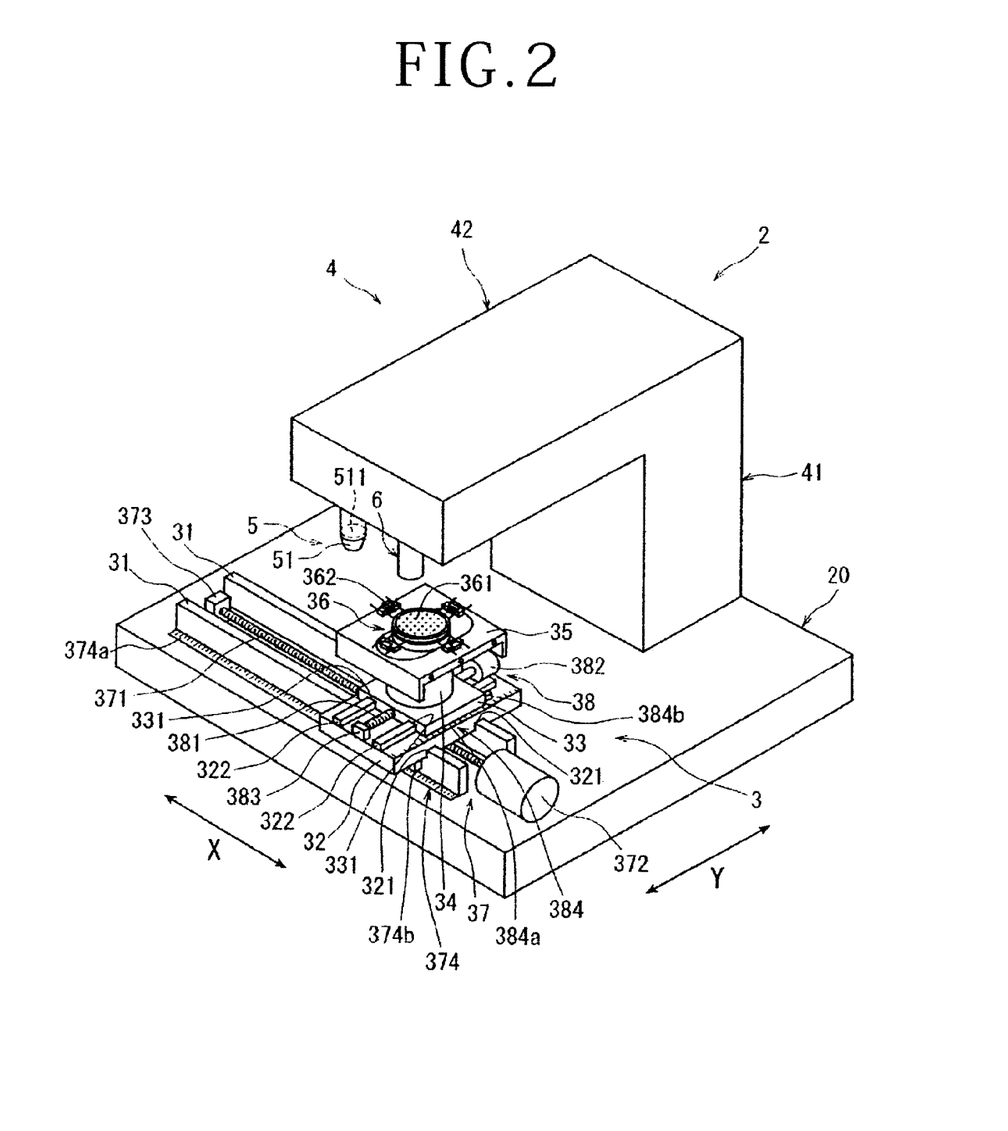
FIG. 2 is a perspective view of a laser processing apparatus for performing a shield tunnel forming step in the present invention.

FIG. 2 is a perspective view of a laser processing apparatus 2 for performing a shield tunnel forming step in the chip manufacturing method according to the present invention. The laser processing apparatus 2 shown in FIG. 2 includes a stationary base 20, a chuck table mechanism 3 for holding a workpiece, the chuck table mechanism 3 being provided on the stationary base 20 so as to be movable in the direction (X direction) shown by an arrow X, and a laser beam applying unit 4 as laser beam applying means provided in the stationary base 20.

The chuck table mechanism 3 includes a pair of guide rails 31 provided on the stationary base 20 so as to extend parallel to each other in the X direction, a first slide block 32 provided on the guide rails 31 so as to be movable in the X direction, a second slide block 33 provided on the first slide block 32 so as to be movable in the direction (Y direction) shown by an arrow Y perpendicular to the X direction, a support table 35 supported by a cylindrical member 34 standing on the second slide block 33, and a chuck table 36 as workpiece holding means. The chuck table 36 has a vacuum chuck 361 formed of a porous material. The platelike workpiece 10 as a workpiece is adapted to be held under suction through the protective tape T on the upper surface (holding surface) of the vacuum chuck 361 by operating suction means (not shown). The chuck table 36 is rotatable by a pulse motor (not shown) provided in the cylindrical member 34. Further, the chuck table 36 is provided with a plurality of clamps 362 for fixing the annular frame F supporting the platelike workpiece 10 through the protective tape T.

The lower surface of the first slide block 32 is formed with a pair of guided grooves 321 for slidably engaging the pair of guide rails 31 mentioned above. A pair of guide rails 322 are provided on the upper surface of the first slide block 32 so as to extend parallel to each other in the Y direction. Accordingly, the first slide block 32 is movable in the X direction along the guide rails 31 by the slidable engagement of the guided grooves 321 with the guide rails 31. The chuck table mechanism 3 further includes first feeding means 37 for moving the first slide block 32 in the X direction along the guide rails 31. The first feeding means 37 includes an externally threaded rod 371 extending parallel to the guide rails 31 so as to be interposed therebetween and a pulse motor 372 as a drive source for rotationally driving the externally threaded rod 371. The externally threaded rod 371 is rotatably supported at one end thereof to a bearing block 373 fixed to the stationary base 20 and is connected at the other end to the output shaft of the pulse motor 372 so as to receive the torque thereof. The externally threaded rod 371 is engaged with a tapped through hole formed in an internally threaded block (not shown) projecting from the lower surface of the first slide block 32 at a central portion thereof. Accordingly, the first slide block 32 is moved in the X direction along the guide rails 31 by operating the pulse motor 372 to normally or reversely rotate the externally threaded rod 371.

The laser processing apparatus 2 includes X position detecting means 374 for detecting the X position of the chuck table 36, that is, the feed amount of the chuck table 36 in the X direction. The X position detecting means 374 includes a linear scale 374a extending along one of the guide rails 31 and a read head 374b provided on the first slide block 32 and movable along the linear scale 374a together with the first slide block 32. The read head 374b of the X position detecting means 374 transmits a pulse signal of one pulse every 1 μm in this preferred embodiment to control means (not shown). This control means counts the number of pulses as the pulse signal input from the read head 374b to thereby detect the X position of the chuck table 36. In the case that the pulse motor 372 is used as the drive source for the first feeding means 37 as in this preferred embodiment, the number of pulses as a drive signal output from the control means to the pulse motor 372 may be counted by the control means to thereby detect the X position of the chuck table 36. In the case that a servo motor is used as the drive source for the first feeding means 37, a pulse signal output from a rotary encoder for detecting the rotational speed of the servo motor may be sent to the control means, and the number of pulses as the pulse signal input from the rotary encoder into the control means may be counted by the control means to thereby detect the X position of the chuck table 36.

The lower surface of the second slide block 33 is formed with a pair of guided grooves 331 for slidably engaging the pair of guide rails 322 provided on the upper surface of the first slide block 32 as mentioned above. Accordingly, the second slide block 33 is movable in the Y direction along the guide rails 322 by the slidable engagement of the guided grooves 331 with the guide rails 322. The chuck table mechanism 3 further includes second feeding means 38 for moving the second slide block 33 in the Y direction along the guide rails 322. The second feeding means 38 includes an externally threaded rod 381 extending parallel to the guide rails 322 so as to be interposed therebetween and a pulse motor 382 as a drive source for rotationally driving the externally threaded rod 381. The externally threaded rod 381 is rotatably supported at one end thereof to a bearing block 383 fixed to the upper surface of the first slide block 32 and is connected at the other end to the output shaft of the pulse motor 382 so as to receive the torque thereof. The externally threaded rod 381 is engaged with a tapped through hole formed in an internally threaded block (not shown) projecting from the lower surface of the second slide block 33 at a central portion thereof. Accordingly, the second slide block 33 is moved in the Y direction along the guide rails 322 by operating the pulse motor 382 to normally or reversely rotate the externally threaded rod 381.

The laser processing apparatus 2 includes Y position detecting means 384 for detecting the Y position of the chuck table 36, that is, the feed amount of the chuck table 36 in the Y direction. The Y position detecting means 384 includes a linear scale 384a extending along one of the guide rails 322 and a read head 384b provided on the second slide block 33 and movable along the linear scale 384a together with the second slide block 33. The read head 384b of the Y position detecting means 384 transmits a pulse signal of one pulse every 1 μm in this preferred embodiment to the control means (not shown). This control means counts the number of pulses as the pulse signal input from the read head 384b to thereby detect the Y position of the chuck table 36. In the case that the pulse motor 382 is used as the drive source for the second feeding means 38 as in this preferred embodiment, the number of pulses as a drive signal output from the control means to the pulse motor 382 may be counted by the control means to thereby detect the Y position of the chuck table 36. In the case that a servo motor is used as the drive source for the second feeding means 38, a pulse signal output from a rotary encoder for detecting the rotational speed of the servo motor may be sent to the control means, and the number of pulses as the pulse signal input from the rotary encoder into the control means may be counted by the control means to thereby detect the Y position of the chuck table 36.

The laser beam applying unit 4 includes a support member 41 provided on the stationary base 20, a casing 42 supported by the support member 41 so as to extend in a substantially horizontal direction, laser beam applying means 5 provided in the casing 42, and imaging means 6 provided at the front end portion of the casing 42 for detecting a subject area to be laser-processed.

The laser beam applying means 5 includes pulsed laser beam oscillating means (not shown) provided in the casing 42, the pulsed laser beam oscillating means including a pulsed laser beam oscillator and repetition frequency setting means. The laser beam applying means 5 further includes focusing means 51 mounted on the front end of the casing 42. The focusing means 51 has a focusing lens 511 for focusing a pulsed laser beam oscillated by the pulsed laser beam oscillating means. The numerical aperture (NA) of the focusing lens 511 of the focusing means 51 is set in the following manner. That is, the numerical aperture (NA) of the focusing lens 511 is set so that the value obtained by dividing the numerical aperture (NA) of the focusing lens 511 by the refractive index (N) of the single crystal substrate falls within the range of 0.05 to 0.2 (numerical aperture setting step). The laser beam applying means 5 further includes focal position adjusting means (not shown) for adjusting the focal position of the pulsed laser beam to be focused by the focusing lens 511 of the focusing means 51.

The imaging means 6 is mounted on the front end portion of the casing 42 in the vicinity of the focusing means 51 constituting the laser beam applying means 5. The imaging means 6 includes illuminating means for illuminating the workpiece, an optical system for capturing an area illuminated by the illuminating means, and an imaging device (CCD) for detecting an image in the area captured by the optical system. An image signal output from the imaging means 6 is transmitted to the control means (not shown).

By using the laser processing apparatus 2 configured above, a shield tunnel forming step is performed in such a manner that a pulsed laser beam having a transmission wavelength to the platelike workpiece 10 is applied along the contour 101 of each chip to be formed (the contour 101 being preliminarily set on the front side of the platelike workpiece 10 processed by the workpiece supporting step mentioned above), thereby forming a plurality of shield tunnels inside the platelike workpiece 10 along the contour 101 of each chip to be formed, each shield tunnel being composed of a fine hole and an amorphous region formed around the fine hole for shielding the fine hole. The coordinates of the contour 101 of each chip to be formed and the coordinates of the processing start position 101a of each contour 101 are preliminarily stored in the memory constituting the control means (not shown) included in the laser processing apparatus 2. Prior to forming the plural shield tunnels along the contour 101 of each chip set on the platelike workpiece 10, the platelike workpiece 10 attached to the protective tape T is placed on the chuck table 36 of the laser processing apparatus 2 shown in FIG. 2 in the condition where the protective tape T is in contact with the upper surface of the chuck table 36. Thereafter, the suction means (not shown) is operated to hold the platelike workpiece 10 through the protective tape T on the vacuum chuck 361 of the chuck table 36 under suction (workpiece holding step).

Figure 3A:
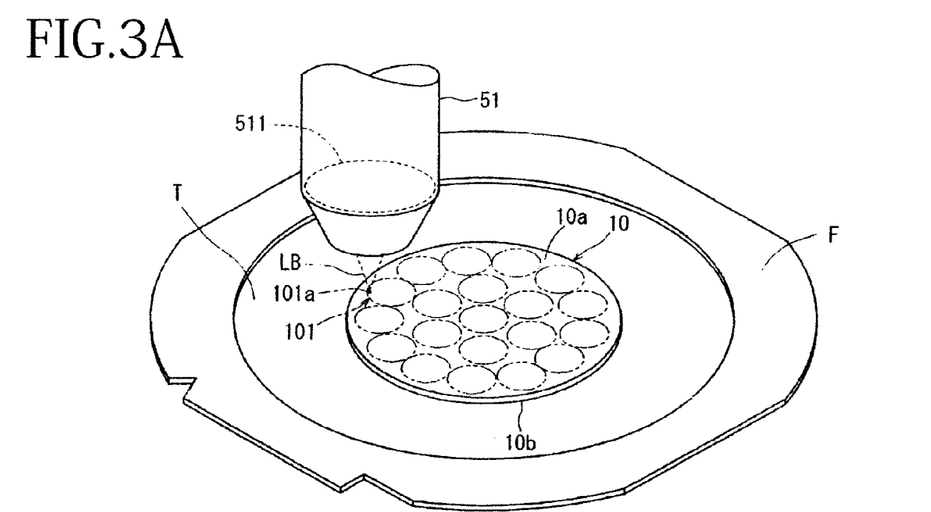
FIGS. 3A to 3D are views for illustrating the shield tunnel forming step to be performed by using the laser processing apparatus shown in FIG. 2.

After performing the workpiece holding step mentioned above, the control means (not shown) operates first feeding means 37 and the second feeding means 38 to move the chuck table 36 holding the platelike workpiece 10 so that the processing start position 101a of the contour 101 of a predetermined one of the plural chips set on the platelike workpiece 10 becomes a position directly below the focusing means 51 of the laser beam applying means 5 as shown in FIG. 3A. Thereafter, the focal position adjusting means (not shown) is operated to move the focusing means 51 in the direction along the optical axis of the focusing lens 511 so that the focal point of a pulsed laser beam LB to be focused by the focusing lens 511 is set at a desired position in the direction along the thickness of the platelike workpiece (positioning step). In this preferred embodiment, the focal point of the pulsed laser beam LB is set inside the platelike workpiece 10 at a desired position near the upper surface (front side 10a) to which the pulsed laser beam LB is applied (e.g., at the depth from the front side 10a toward the back side 10b by a distance of 5 to 10 µm).

After performing the positioning step mentioned above, the laser beam applying means 5 is operated to apply the pulsed laser beam LB from the focusing means 51 to the platelike workpiece 10 held on the chuck table 36. At the same time, the first feeding means 37 and the second feeding means 38 are operated to move the chuck table 36 according to the contour 101 of the predetermined chip set on the platelike workpiece 10. When the processing start position 101a of the contour 101 is returned to the position directly below the focusing means 51, the application of the pulsed laser beam LB is stopped and the operation of the first feeding means 37 and the second feeding means 38 is stopped to stop the movement of the chuck table 36 (shield tunnel forming step). This shield tunnel forming step is similarly performed according to the contours 101 of all the chips set on the platelike workpiece 10.

Figure 3B:
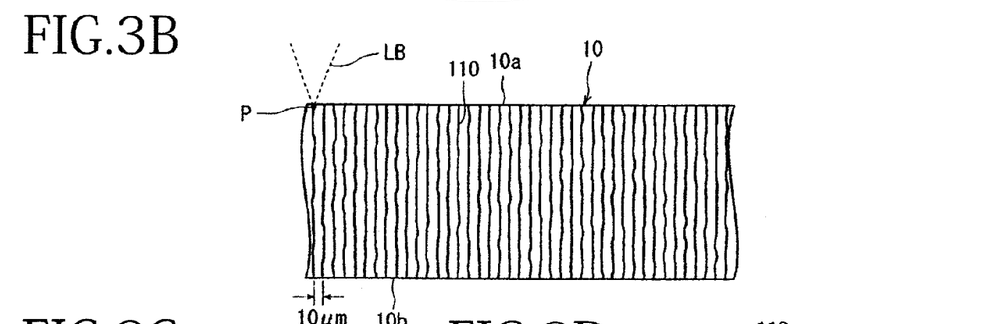
Figure 3C:
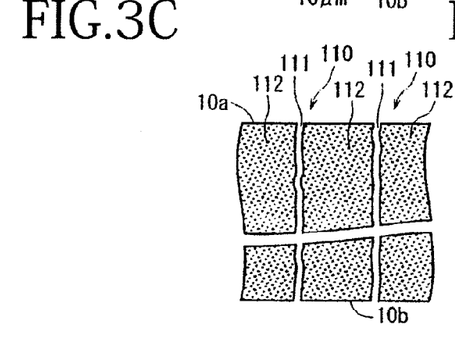
Figure 3D:
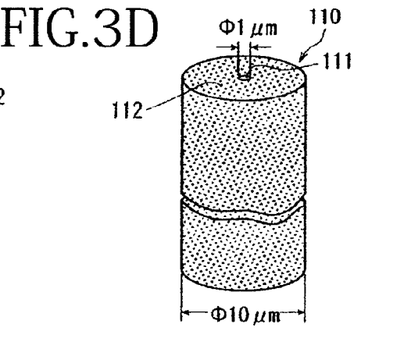

By performing the shield tunnel forming step mentioned above, a plurality of fine holes 111 and a plurality of amorphous regions 112 are so grown as to extend from the front side 10a (upper surface) where the focal point P of the pulsed laser beam LB is set to the back side 10b (lower surface) as shown in FIGS. 3B and 3C, wherein the amorphous regions 112 are formed around the fine holes 111, respectively. As a result, a plurality of amorphous shield tunnels 110 are formed inside the platelike workpiece 10 along the contour 101 of each chip at predetermined intervals, e.g., 10 µm intervals (=(work feed speed: 500 mm/second)/(repetition frequency: 50 kHz)) as shown in FIG. 3B. As shown in FIGS. 3C and 3D, each shield tunnel 110 is composed of the central fine hole 111 having a diameter of about 1 µm and the amorphous region 112 formed around the central fine hole 111 and having a diameter of 10 µm. In this preferred embodiment, the amorphous regions 112 of any adjacent ones of the plural shield tunnels 110 are connected with each other. Each amorphous shield tunnel 110 formed by the shield tunnel forming step mentioned above extends from the front side 10a (upper surface) of the platelike workpiece 10 to the back side 10b (lower surface) thereof. Accordingly, even when the thickness of the platelike workpiece 10 is large, it is sufficient to once apply the pulsed laser beam LB along the contour 101 of each chip to be formed, so that the productivity can be greatly improved.

To form a good shield tunnel 110 in the shield tunnel forming step, it is important that the value (S) obtained by dividing the numerical aperture (NA) of the focusing lens 511 by the refractive index (N) of the single crystal substrate such as a silica glass substrate and a sapphire substrate falls within the range of 0.05 to 0.2 as described above.

Figure 4:
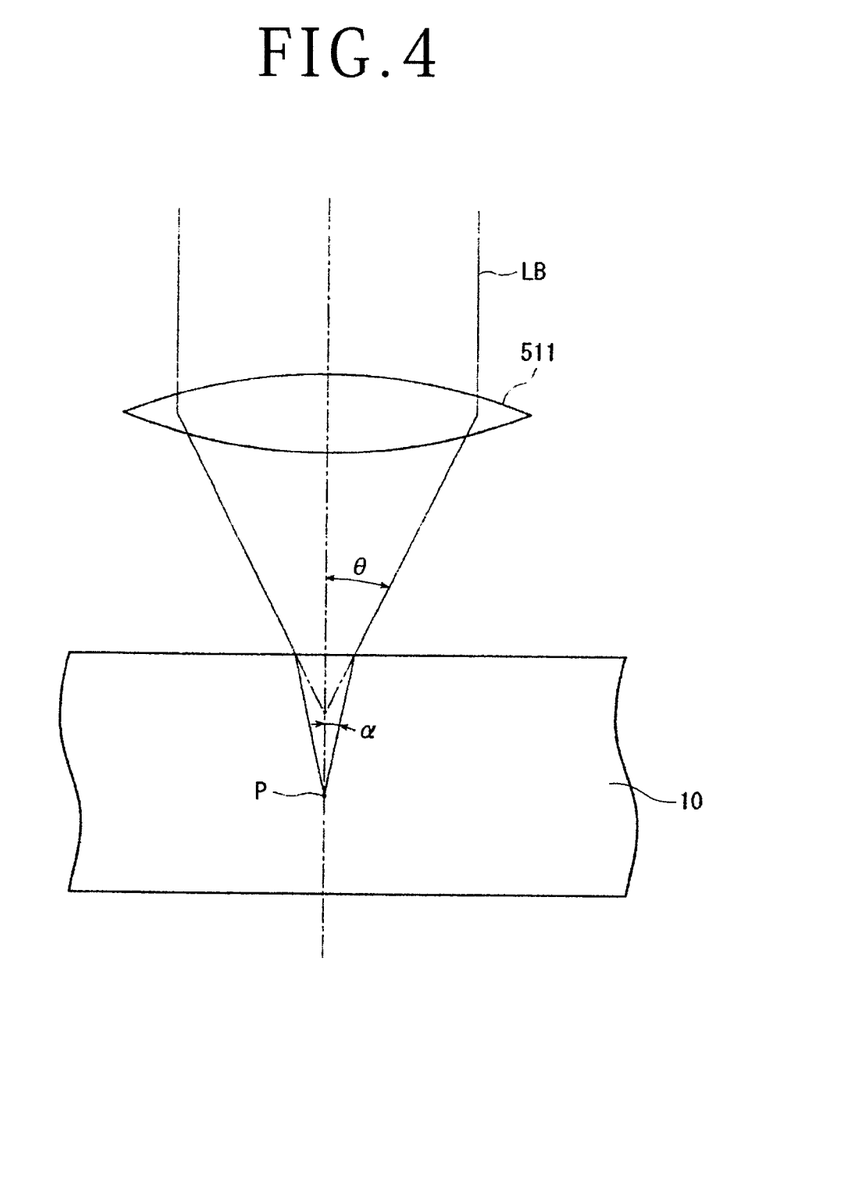
FIG. 4 is a diagram showing the relation between the numerical aperture (NA) of a focusing lens, the refractive index (N) of the platelike workpiece, and the value (S=NA/N) obtained by dividing the numerical aperture (NA) by the refractive index (N)

There will now be described with reference to FIG. 4 the relation between the numerical aperture (NA), the refractive index (N), and the value (S=NA/N) obtained by dividing the numerical aperture (NA) by the refractive index (N). As shown in FIG. 4, the pulsed laser beam LB entering the focusing lens 511 is focused at an angle θ with respect to the optical axis of the focusing lens 511. In this case, the numerical aperture (NA) of the focusing lens 511 is expressed as sin θ (i.e., NA=sin θ). When the pulsed laser beam LB focused by the focusing lens 511 is applied to the platelike workpiece 10 as the single crystal substrate, the pulsed laser beam LB is refracted at an angle (α) with respect to the optical axis because the density of the single crystal substrate constituting the platelike workpiece 10 is higher than that of air, and then focused at the focal point P. This angle (α) with respect to the optical axis differs according to the refractive index (N) of the single crystal substrate constituting the platelike workpiece 10. Since the refractive index (N) is expressed as N=sin θ/sin α, the value (S=NA/N) obtained by dividing the numerical aperture (NA) by the refractive index (N) of the single crystal substrate is given by sin α. Accordingly, it is important that sin α is set in the range of 0.05 to 0.2 (i.e., 0.05≤sin α≤0.2).

There will now be described the reason why the value (S=NA/N) obtained by dividing the numerical aperture (NA) of the focusing lens 511 by the refractive index (N) of the single crystal substrate is set in the range of 0.05 to 0.2.

EXAMPLE 1-1

By using a silica glass substrate (refractive index: 1.45) having a thickness of 500 μm as the platelike workpiece 10, the shield tunnel forming step was performed under the following processing conditions to form a shield tunnel, and it was determined whether or not the shield tunnel is good.
Processing Conditions
  Wavelength: 1064 nm
  Repetition frequency: 50 kHz
  Pulse width: 10 ps
  Average power: 2 W
  Focused spot diameter: 10 μm
  Work feed speed: 500 mm/second

| Numerical aperture (NA) of the focusing lens | Good/poor condition of the shield tunnel | S = NA/N |
|---|---|---|
| 0.05 | Poor: not formed | 0.035 |
| 0.1 | Good | 0.069 |
| 0.15 | Good | 0.103 |
| 0.2 | Good | 0.138 |
| 0.25 | Good | 0.172 |
| 0.3 | Slightly good | 0.207 |
| 0.35 | Poor: voids generated | 0.241 |
| 0.4 | Poor: voids generated | 0.276 |

It is apparent from the above results that in the case of using a silica glass substrate (refractive index: 1.45) as the single crystal substrate a good shield tunnel can be formed by setting the numerical aperture (NA) of the focusing lens 511 for focusing the pulsed laser beam so that the value (S=NA/N) obtained by dividing the numerical aperture (NA) by the refractive index (N) of the single crystal substrate falls within the range of 0.05 to 0.2. Accordingly, it is important that the numerical aperture (NA) of the focusing lens 511 for focusing the pulsed laser beam is set in the range of 0.1 to 0.25 in the case of using a silica glass substrate (refractive index: 1.45) as the single crystal substrate.

It was confirmed from Example 1-1 that a good shield tunnel can be formed by setting the numerical aperture (NA) of the focusing lens 511 for focusing the pulsed laser beam so that the value (S=NA/N) obtained by dividing the numerical aperture (NA) by the refractive index (N) of the single crystal substrate falls within the range of 0.05 to 0.2.

EXAMPLE 1-2

By using a sapphire ($Al_2O_3$) substrate (refractive index: 1.76) having a thickness of 500 μm as the platelike workpiece 10, the shield tunnel forming step was performed under the following processing conditions to form a shield tunnel, and it was determined whether or not the shield tunnel is good.
Processing Conditions
  Wavelength: 1064 nm
  Repetition frequency: 50 kHz
  Pulse width: 10 ps
  Average power: 2 W
  Focused spot diameter: 10 μm
  Work feed speed: 500 mm/second

| Numerical aperture (NA) of the focusing lens | Good/poor condition of the shield tunnel | S = NA/N |
|---|---|---|
| 0.05 | Poor: not formed | |
| 0.1 | Slightly good | 0.057 |
| 0.15 | Good | 0.085 |
| 0.2 | Good | 0.114 |
| 0.25 | Good | 0.142 |
| 0.3 | Good | 0.170 |
| 0.35 | Good | 0.198 |
| 0.4 | Poor | 0.227 |
| 0.45 | Poor: voids generated | |
| 0.5 | Poor: voids generated | |
| 0.55 | Poor: voids generated | |
| 0.6 | Poor: voids generated | |

It is apparent from the above results that in the case of using a sapphire substrate (refractive index: 1.76) as the single crystal substrate a substantially good shield tunnel can be formed by setting the numerical aperture (NA) of the focusing lens 511 for focusing the pulsed laser beam so that the value (S=NA/N) obtained by dividing the numerical aperture (NA) by the refractive index (N) of the single crystal substrate falls within the range of 0.05 to 0.2. Accordingly, it is important that the numerical aperture (NA) of the focusing lens 511 for focusing the pulsed laser beam is set in the range of 0.1 to 0.35 in the case of using a sapphire substrate (refractive index: 1.76) as the single crystal substrate.

It was confirmed from Example 1-2 that a substantially good shield tunnel can be formed by setting the numerical aperture (NA) of the focusing lens 511 for focusing the pulsed laser beam so that the value (S=NA/N) obtained by dividing the numerical aperture (NA) by the refractive index (N) of the single crystal substrate falls within the range of 0.05 to 0.2.

After performing the shield tunnel forming step mentioned above, a chip forming step is performed in such a manner that ultrasonic vibration is applied to the platelike workpiece 10 to thereby break the contour 101 of each chip where the shield tunnels 10 have been formed, thereby forming the plural chips from the platelike workpiece 10. A first preferred embodiment of the chip forming step will now be described with reference to FIGS. 5A to 5C.

Figure 5A:
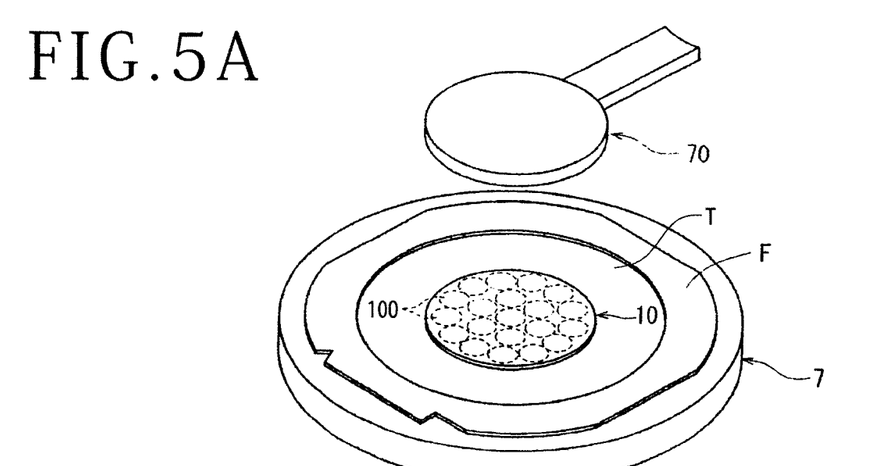
FIGS. 5A to 5C are perspective views for illustrating a first preferred embodiment of a chip forming step to be performed after performing the shield tunnel forming step.
Figure 5B:
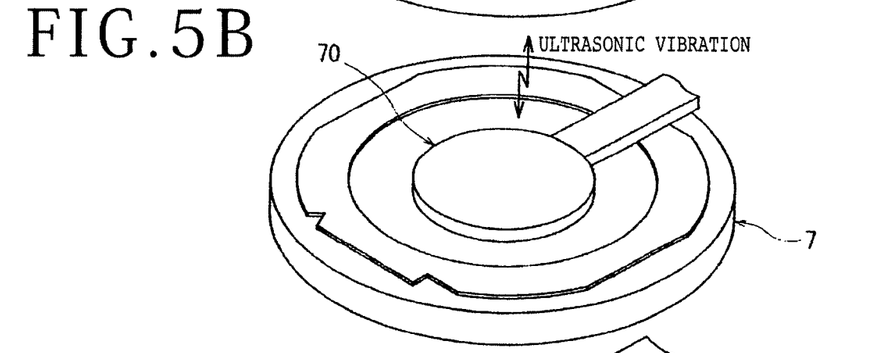
Figure 5C:
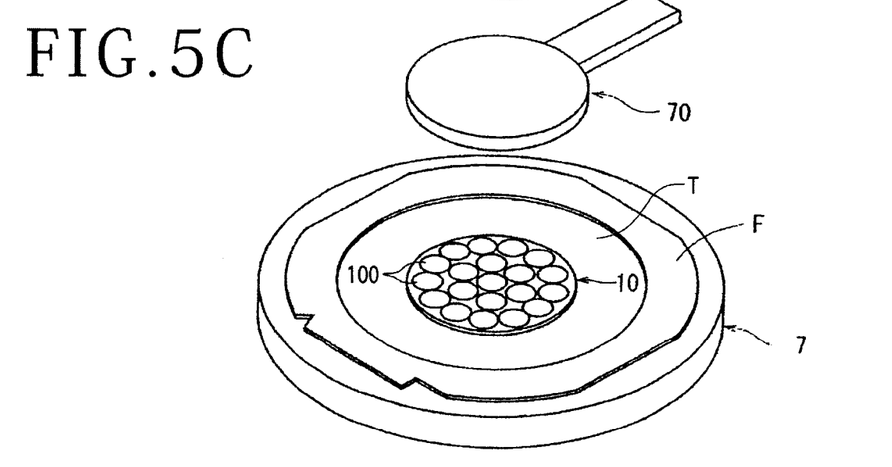
Figure 6:
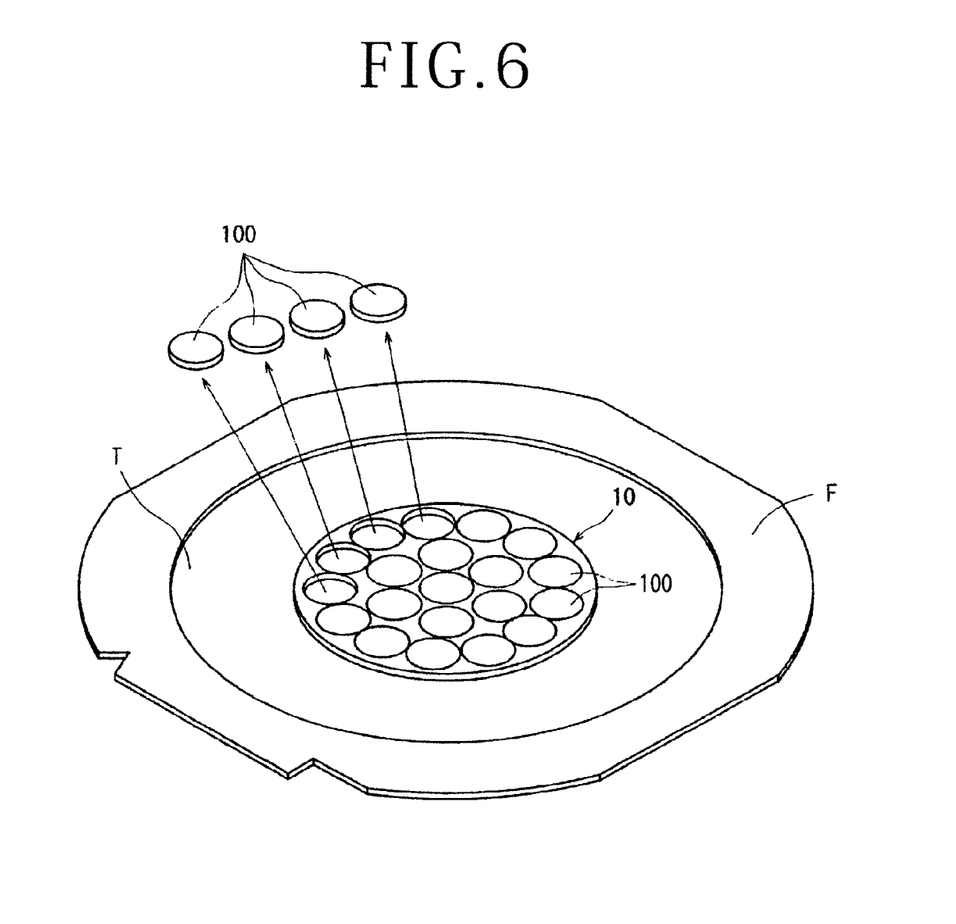
FIG. 6 is a perspective view for illustrating a pickup step of peeling chips from the protective tape after performing the chip forming step shown in FIGS. 5A to 5C.

In the first preferred embodiment of the chip forming step, the platelike workpiece 10 processed by the shield tunnel forming step mentioned above is first placed on a silicone rubber table 7 in the condition where the protective tape T attached to the back side 10b of the platelike workpiece 10 is in contact with the upper surface of the silicone rubber table 7 as shown in FIG. 5A. Accordingly, the platelike workpiece 10 supported through the protective tape T to the annular frame F is placed on the silicone rubber table 7 in the condition where the front side 10a of the platelike workpiece 10 is oriented upward. Thereafter, the lower surface of an ultrasonic vibration applying pad 70 is placed on the front side 10a (upper surface) of the platelike workpiece 10 placed on the silicone rubber table 7 through the protective tape T as shown in FIG. 5B. In this condition, ultrasonic generating means (not shown) provided in the ultrasonic vibration applying pad 70 is operated to apply ultrasonic vibration to the platelike workpiece 10. As a result, the contour 101 of each chip where the shield tunnels 110 have been formed is broken to form a plurality of individual chips 100 from the platelike workpiece 10 as shown in FIG. 5C. Thereafter, the chips 100 may be peeled and picked up from the protective tape T as shown in FIG. 6.

Figure 7:
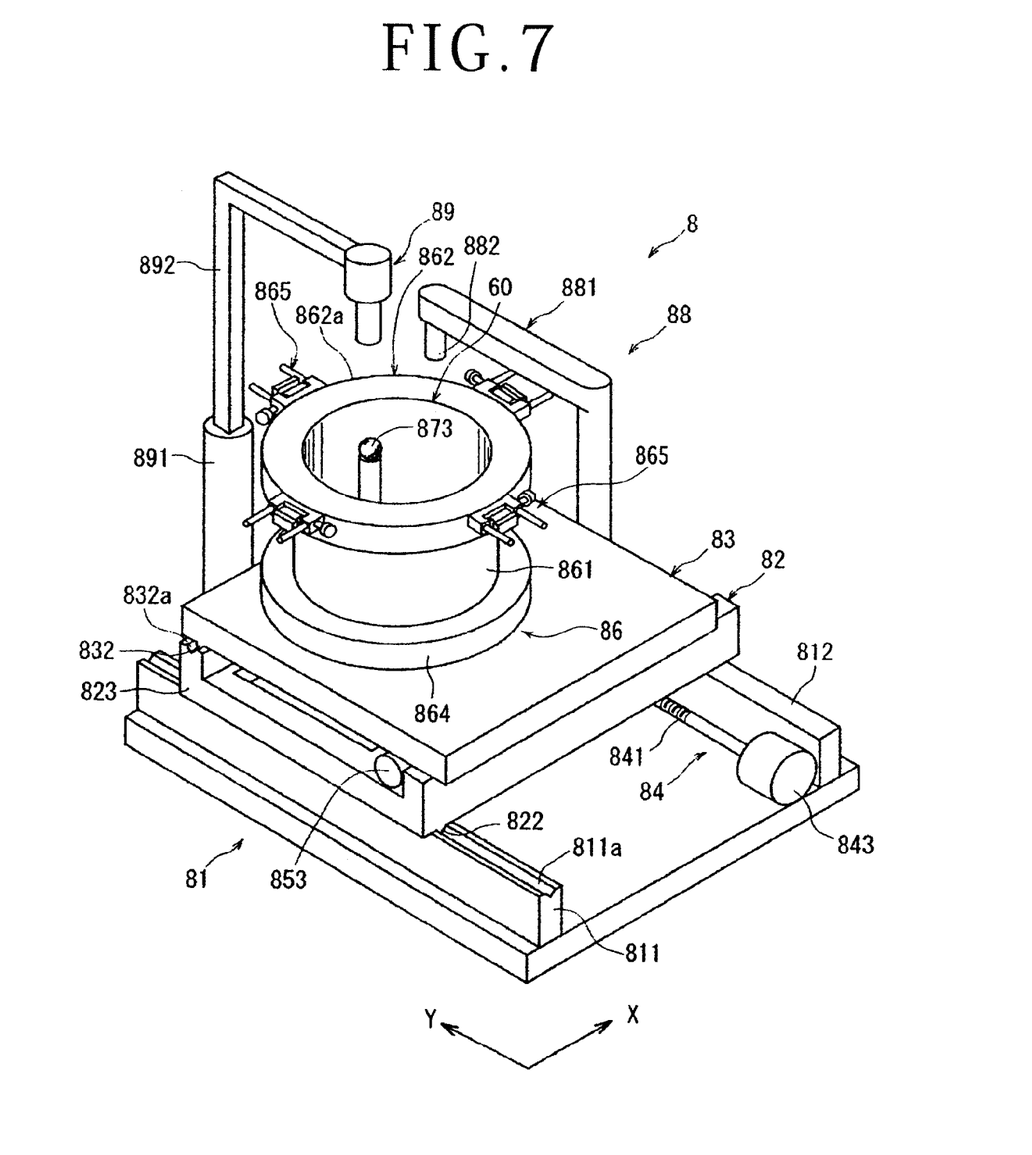
FIG. 7 is a perspective view of a shield tunnel breaking apparatus for performing a second preferred embodiment of the chip forming step in the present invention.

A second preferred embodiment of the chip forming step will now be described with reference to FIGS. 7 to 10C. The second preferred embodiment of the chip forming step is performed by using a shield tunnel breaking apparatus 8 shown in FIGS. 7 to 9. FIG. 7 is a perspective view of the shield tunnel breaking apparatus 8, and FIG. 8 is an exploded perspective view of an essential part of the shield tunnel breaking apparatus 8 shown in FIG. 7.

The shield tunnel breaking apparatus 8 for performing the second preferred embodiment of the chip forming step includes a base 81, a first table 82 provided on the base 81 so as to be movable in the direction (Y direction) shown by an arrow Y in FIG. 7, and a second table 83 provided on the first table 82 so as to be movable in the direction (X direction) shown by an arrow X in FIG. 7, the X direction being perpendicular to the Y direction as shown in FIG. 7. The base 81 is a rectangular member, and two parallel guide rails 811 and 812 are provided on the upper surface of the base 81 at its opposite side portions so as to extend in the Y direction. A guide groove 811a having a V-shaped cross section is formed on the upper surface of the guide rail 811.

Figure 8:
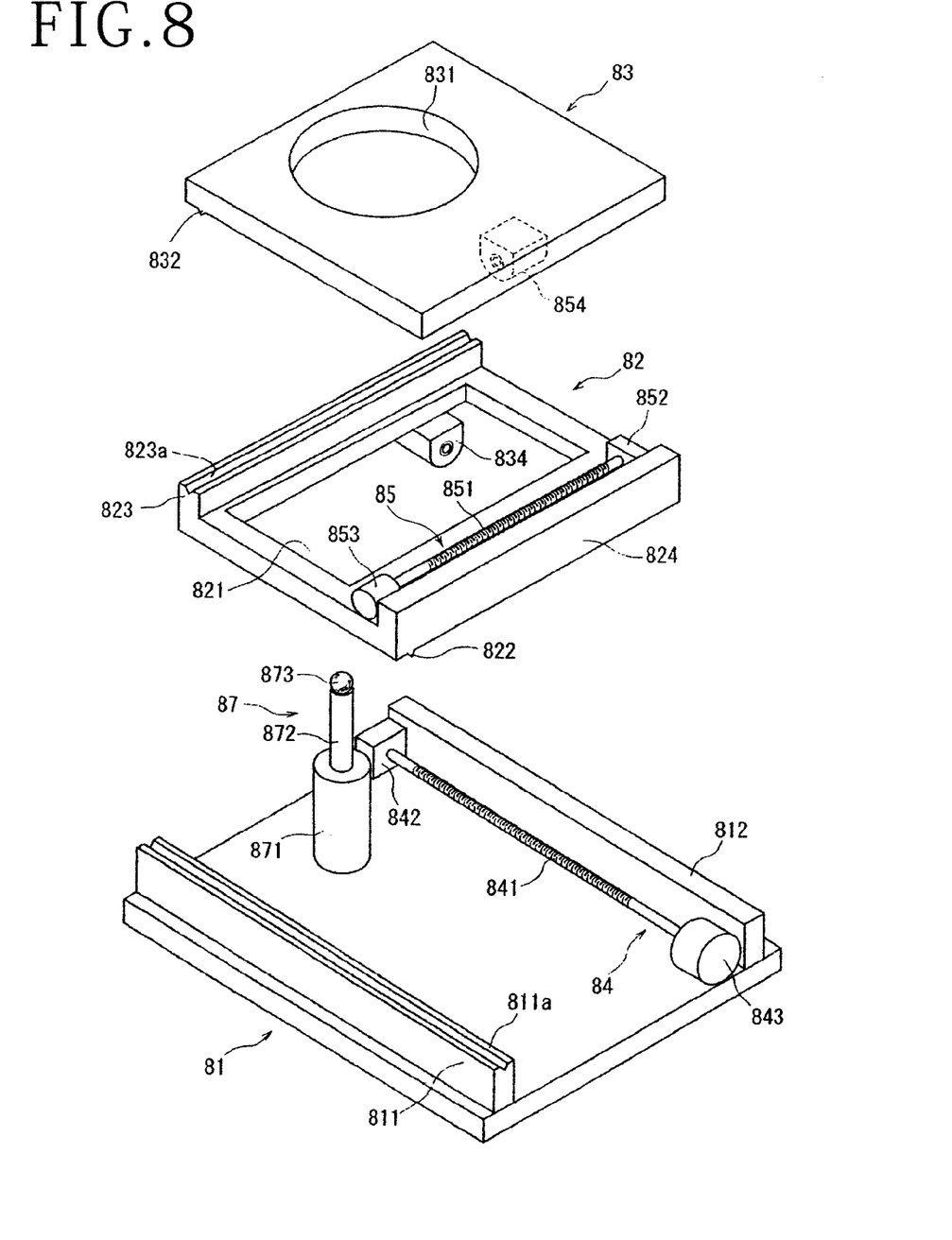
FIG. 8 is an exploded perspective view of an essential part of the shield tunnel breaking apparatus shown in FIG. 7.

As shown in FIG. 8, the first table 82 is a rectangular member like a window frame such that a rectangular opening 821 is formed at its central portion. A guided rail 822 for slidably engaging the guide groove 811a of the guide rail 811 of the base 81 is provided on the lower surface of the first table 82 at its one end portion. Further, two parallel guide rails 823 and 824 are provided on the upper surface of the first table 82 at its opposite side portions so as to extend in the direction perpendicular to the guide rail 822. A guide groove 823a having a V-shaped cross section is formed on the upper surface of the guide rail 823. As shown in FIG. 7, the first table 82 is slidably mounted on the base 81 in such a manner that the guided rail 822 of the first table 82 is slidably engaged with the guide groove 811a of the guide rail 811 of the base 81, and the lower surface of the other end portion of the first table 82 is slidably placed on the guide rail 812 of the base 81. The shield tunnel breaking apparatus 8 further includes first moving means 84 for moving the first table 82 in the Y direction along the guide rails 811 and 812 of the base 81. As shown in FIG. 8, the first moving means 84 is composed of an externally threaded rod 841 extending parallel to the guide rail 812 of the base 81, a bearing 842 provided on the base 81 for rotatably supporting one end of the externally threaded rod 841, a pulse motor 843 connected to the other end of the externally threaded rod 841 for rotationally driving the externally threaded rod 841, and an internally threaded block 834 provided on the lower surface of the first table 82 and threadedly engaged with the externally threaded rod 841. With this arrangement, the first moving means 84 is operated in such a manner that when the pulse motor 843 is operated to rotate the externally threaded rod 841, the first table 82 is moved in the Y direction shown in FIG. 7 by the engagement of the externally threaded rod 841 with the internally threaded block 834.

As shown in FIG. 8, the second table 83 is a rectangular member having a circular hole 831 at its central portion. A guided rail 832 for slidably engaging the guide groove 823a of the guide rail 823 of the first table 82 is provided on the lower surface of the second table 83 at its one end portion. As shown in FIG. 7, the second table 83 is slidably mounted on the first table 82 in such a manner that the guided rail 832 of the second table 83 is slidably engaged with the guide groove 823a of the guide rail 823 of the first table 82, and the lower surface of the other end portion of the second table 83 is slidably placed on the guide rail 824 of the first table 82. The shield tunnel breaking apparatus 8 further includes second moving means 85 for moving the second table 83 in the X direction along the guide rails 823 and 824 of the first table 82. As shown in FIG. 8, the second moving means 85 is composed of an externally threaded rod 851 extending parallel to the guide rail 824 of the first table 82, a bearing 852 provided on the first table 82 for rotatably supporting one end of the externally threaded rod 851, a pulse motor 853 connected to the other end of the externally threaded rod 851 for rotationally driving the externally threaded rod 851, and an internally threaded block 854 provided on the lower surface of the second table 83 and threadedly engaged with the externally threaded rod 851. With this arrangement, the second moving means 85 is operated in such a manner that when the pulse motor 853 is operated to rotate the externally threaded rod 851, the second table 83 is moved in the X direction shown in FIG. 7 by the engagement of the externally threaded rod 851 with the internally threaded block 854.

Figure 9:
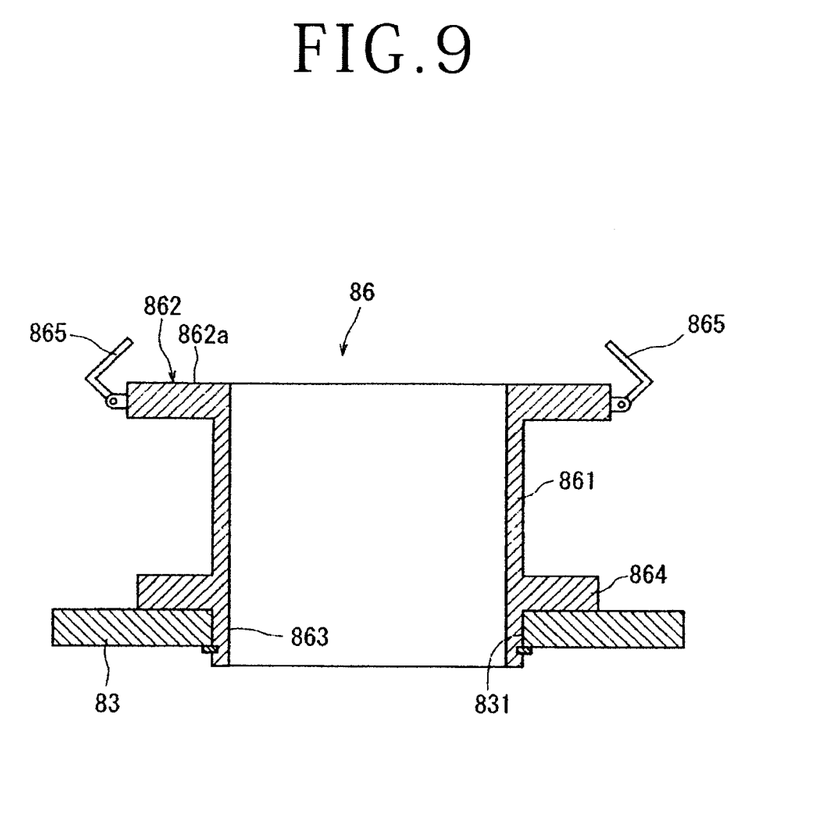
FIG. 9 is a sectional view showing a second table and frame holding means constituting the shield tunnel breaking apparatus shown in FIG. 7.

The shield tunnel breaking apparatus 8 further includes frame holding means 86 for holding the annular frame F. As shown in FIGS. 7 and 9, the frame holding means 86 is composed of a cylindrical portion 861, an annular frame holding portion 862 formed at the upper end of the cylindrical portion 861, a mount portion 863 formed at the lower end of the cylindrical portion 861, and an annular support flange portion 864 formed on the upper side of the mount portion 863. The cylindrical portion 861 has an inner diameter smaller than the inner diameter of the annular frame F and larger than the outer diameter of the platelike workpiece 10 supported through the protective tape T to the annular frame F. The annular frame holding portion 862 is formed at the upper end of the cylindrical portion 861 so as to project radially outward, so that the upper surface of the annular frame holding portion 862 functions as a mounting surface 862a for mounting the annular frame F thereon. The annular frame holding portion 862 is provided with a plurality of clamps 865 for fixing the annular frame F mounted on the mounting surface 862a. The mount portion 863 is rotatably engaged with the circular hole 831 of the second table 83 in such a manner that the outer circumferential surface of the mount portion 863 is in contact with the inner circumferential surface of the circular hole 831. The annular support flange portion 864 is formed on the upper side of the mount portion 863 so as to project radially outward, so that the annular support flange portion 864 is mounted on the second table 83 in the condition where the mount portion 863 is engaged with the circular hole 831 of the second table 83.

The shield tunnel breaking apparatus 8 further includes ultrasonic vibration applying means 87 for applying ultrasonic vibration to the platelike workpiece 10 supported through the protective tape T to the annular frame F held on the annular frame holding portion 862 of the frame holding means 86. As shown in FIGS. 7 and 8, the ultrasonic vibration applying means 87 is provided on the base 81 and located inside the frame holding means 86. As shown in FIG. 8, the ultrasonic vibration applying means 87 is composed of an air cylinder 871 provided on the base 81 and an ultrasonic vibrator 873 provided at the upper end of a piston rod 872 constituting the air cylinder 871. The ultrasonic vibrator 873 is operated in such a manner that a high-frequency voltage having a predetermined frequency is applied from high-frequency voltage applying means (not shown) to the ultrasonic vibrator 873. While the ultrasonic vibrator 873 is spherical in shape in this preferred embodiment, the ultrasonic vibrator 873 may be circular or semicylindrical in shape.

The shield tunnel breaking apparatus 8 further includes cold air blowing means 88 for blowing cold air against the platelike workpiece 10 supported through the protective tape T to the annular frame F held by the frame holding means 86. The cold air blowing means 88 includes a swing arm 881 provided on the base 81 and a cold air nozzle 882 mounted at the front end of the swing arm 881. The cold air nozzle 882 is connected to cold air supplying means (not shown). The swing arm 881 is horizontally swingable by driving means (not shown). The swing arm 881 is also vertically movable.

The shield tunnel breaking apparatus 8 further includes imaging means 89 for imaging the platelike workpiece 10 supported through the protective tape T to the annular frame F held by the frame holding means 86. The imaging means 89 includes an optical system, an imaging device, etc. An air cylinder 891 is provided on the base 81, and an L-shaped support member 892 is connected to the air cylinder 891 so as to be vertically movable by the air cylinder 891. The imaging means 89 is mounted at the front end of the L-shaped support member 891 and located above the annular frame holding portion 862 of the frame holding means 86. The imaging means 89 functions to image the platelike workpiece 10 supported through the protective tape T to the annular frame F held on the annular frame holding portion 862. An image signal output from the imaging means 89 is transmitted to control means (not shown).

Figure 10A:
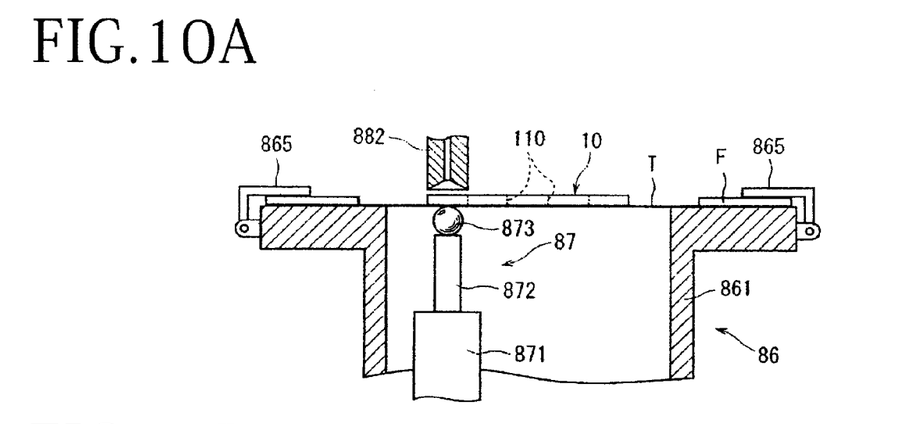
FIGS. 10A to 10C are sectional side views for illustrating the chip forming step to be performed by using the shield tunnel breaking step shown in FIG. 7.

The operation of the shield tunnel breaking apparatus 8 configured above will now be described mainly with reference to FIGS. 10A to 10C. As shown in FIG. 10A, the annular frame F supporting the platelike workpiece 10 through the protective tape T (the platelike workpiece 10 already having the shield tunnels 110) is mounted on the mounting surface 862a of the annular frame holding portion 862 constituting the frame holding means 86 and then fixed to the annular frame holding portion 862 by the clamps 865.

Thereafter, the imaging means 89 and the control means (not shown) are operated to determine the central position of the contour 101 of each chip along which the shield tunnels 110 have been formed in the shield tunnel forming step in the platelike workpiece 10 and then store the central position determined above into a memory included in the control means. The central position of the contour 101 of each chip may be determined by a method including the steps of operating the first moving means 84 and the second moving means 85 to align the center of the contour 101 of each chip with the center of the imaging means 89 and next counting the number of pulses applied to the pulse motor 843 of the first moving means 84 and the number of pulses applied to the pulse motor 853 of the second moving means 85 to thereby determine the X and Y coordinates of the central position of the contour 101 of each chip according to the number of pulses counted above (alignment step).

After performing the alignment step mentioned above, the control means (not shown) operates the cold air blowing means 88 to thereby position the cold air nozzle 882 directly above the ultrasonic vibrator 873 of the ultrasonic vibration applying means 87. Thereafter, the cold air nozzle 882 is lowered to a vertical position just above the upper surface of the platelike workpiece 10 with a predetermined space defined therebetween as shown in FIG. 10A. Thereafter, the first moving means 84 and the second moving means 85 are operated according to the data stored in the memory of the control means (not shown) to thereby set the central position of the contour 101 of a predetermined one of the chips to be formed in the platelike workpiece 10 to the position directly above the ultrasonic vibrator 873 of the ultrasonic vibration applying means 87. Thereafter, the air cylinder 871 is operated to bring the upper end of the ultrasonic vibrator 873 into contact with the protective tape T attached to the lower surface of the platelike workpiece 10 as shown in FIG. 10A. Thereafter, a cold air is blown from the cold air nozzle 882 of the cold air blowing means 88, and a high-frequency voltage having a predetermined frequency is applied to the ultrasonic vibrator 873 to generate ultrasonic vibration in the ultrasonic vibrator 873 as shown in FIG. 10B.

Figure 10B:
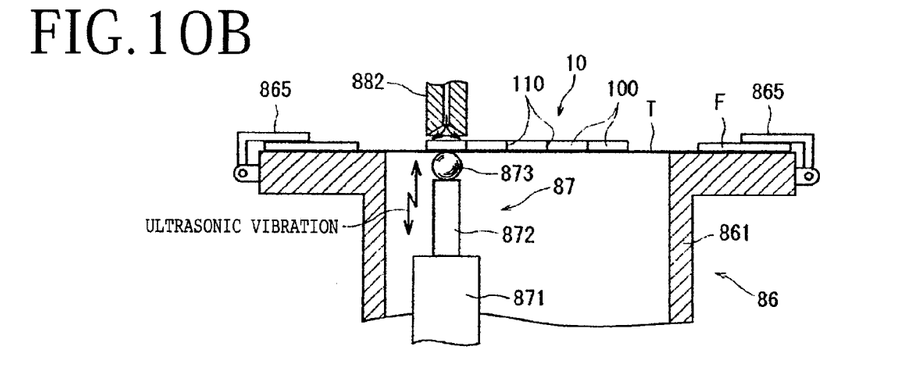
Figure 10C:
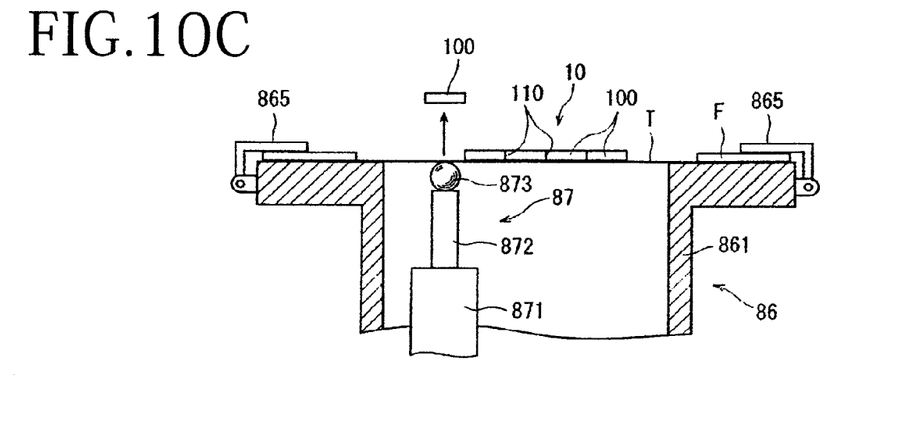

As a result, the shield tunnels 10 formed along the contour 101 of the predetermined chip set on the platelike workpiece 10 are broken by the ultrasonic vibration to form a chip 100 as shown in FIG. 10B. This chip forming step is similarly performed for the contours 101 of all the other chips set on the platelike workpiece 10. At this time, the area inside the contour 101 of each chip is cooled by the cold air blown from the cold air nozzle 882, so that this area is contracted to thereby accelerate the breakage of the shield tunnels 110. After the plural shield tunnels 110 formed along the contour 101 of each chip set on the platelike workpiece 10 are broken to form the individual chips 100 as described above, each chip 100 can be peeled and picked up from the protective tape T as shown in FIG. 10C.

As described above, the chip manufacturing method in this preferred embodiment includes the shield tunnel forming step of applying a pulsed laser beam having a transmission wavelength to the platelike workpiece 10 from the focusing means 51 included in the pulsed laser beam applying means 5 along the contour 101 of each chip to be formed in the condition where the focal point of the pulsed laser beam is set at a predetermined depth from the upper surface of the platelike workpiece 10, thereby forming the plural shield tunnels 110 inside the platelike workpiece 10 along the contour 101 of each chip to be formed, each shield tunnel 110 being composed of the fine hole 111 and the amorphous region 112 formed around the fine hole 111 for shielding the fine hole 111, and the chip forming step of applying ultrasonic vibration to the platelike workpiece 10 processed by the shield tunnel forming step to thereby break the contour 101 of each chip where the shield tunnels 110 have been formed, thereby forming the plural chips 100 from the platelike workpiece 10. Accordingly, a chip having a desired shape can be formed in a short time by the chip manufacturing method of the present invention as compared with the conventional chip manufacturing method.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A chip manufacturing method of forming a chip having a desired shape from a platelike workpiece, said chip manufacturing method comprising:

attaching a protective tape to the platelike workpiece, applying a pulsed laser beam having a transmission wavelength to said platelike workpiece from focusing means included in pulsed laser beam applying means along a contour of said chip to be formed in a condition where the focal point of said pulsed laser beam is set at a predetermined depth from an upper surface of said platelike workpiece, thereby forming a plurality of shield tunnels inside said platelike workpiece along the contour of said chip to be formed, each shield tunnel being composed of a fine hole and an amorphous region formed around said fine hole for shielding said fine hole;

placing the platelike workpiece supported through the protective tape to an annular frame on a silicon rubber table wherein a front side of the platelike workpiece is oriented upward, placing a lower surface of an ultrasonic vibration applying pad on the front side of the platelike workpiece, and applying ultrasonic vibration to said ultrasonic vibration applying pad to thereby break the contour of said chip where said shield tunnels have been formed, thereby forming said chip from said platelike workpiece.

2. The chip manufacturing method according to claim 1, wherein the numerical aperture (NA) of a focusing lens included in said focusing means is set so that a value obtained by dividing the numerical aperture (NA) of said focusing lens by the refractive index (N) of said platelike workpiece falls within the range of 0.05 to 0.2.

3. The chip manufacturing method according to claim 2, wherein said platelike workpiece includes a silica glass substrate, and the numerical aperture (NA) of said focusing lens is set to 0.1 to 0.25.

4. The chip manufacturing method according to claim 2, wherein said platelike workpiece includes a sapphire substrate, and the numerical aperture (NA) of said focusing lens is set to 0.1 to 0.35.

* * * * *